No. 860,802. PATENTED JULY 23, 1907.
J. HARTNESS.
TURNING TOOL.
APPLICATION FILED NOV. 24, 1905.
4 SHEETS—SHEET 1.
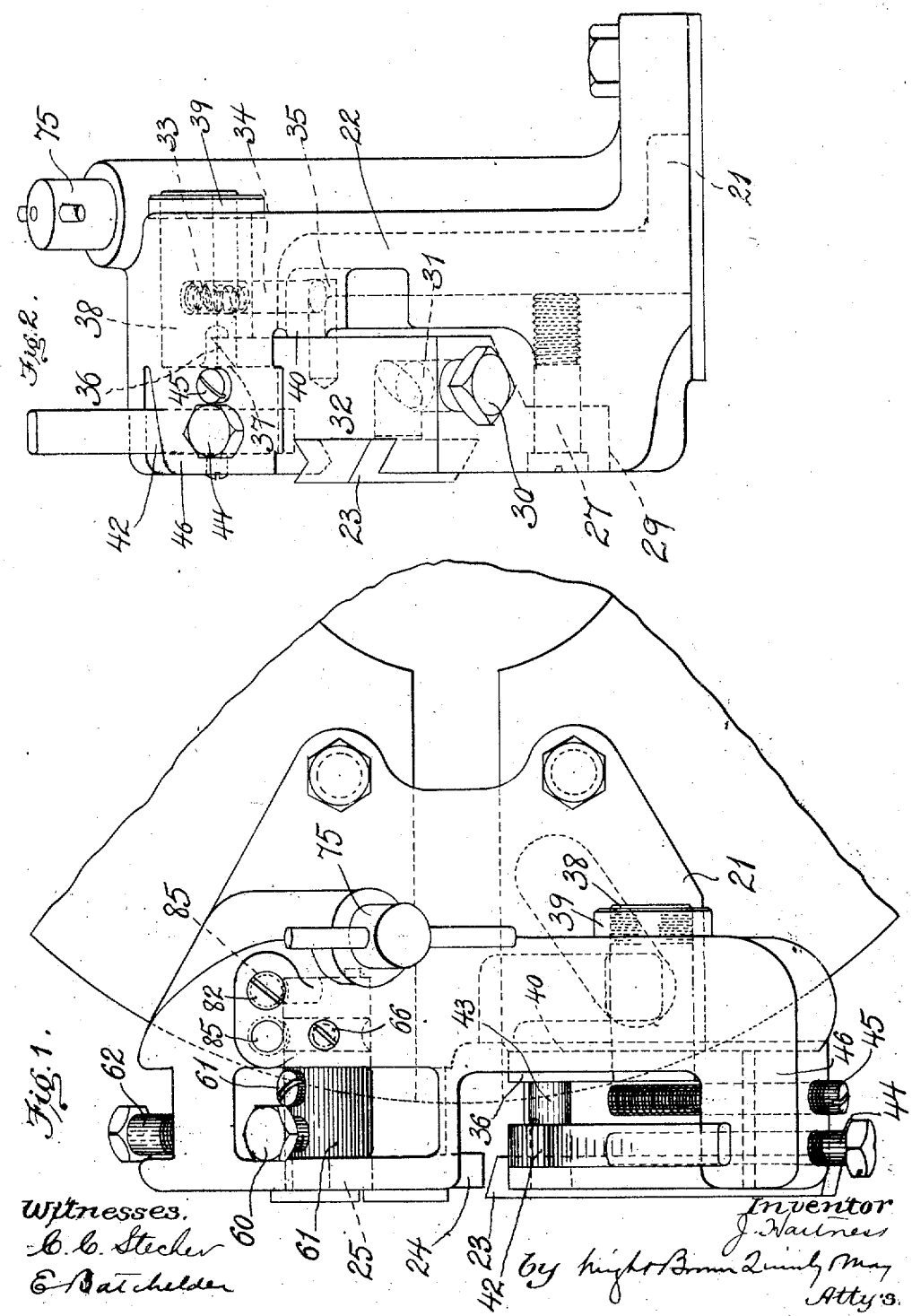

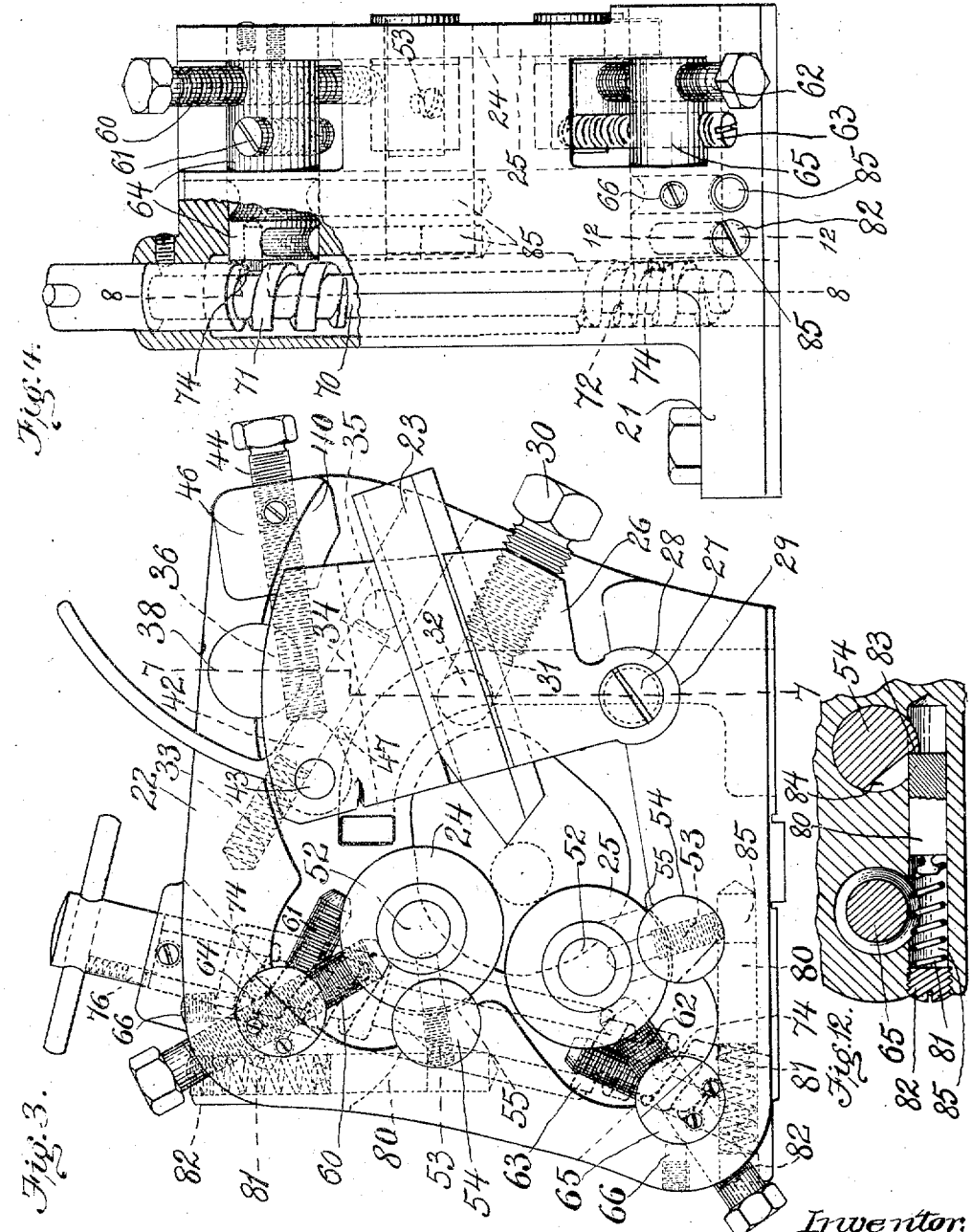

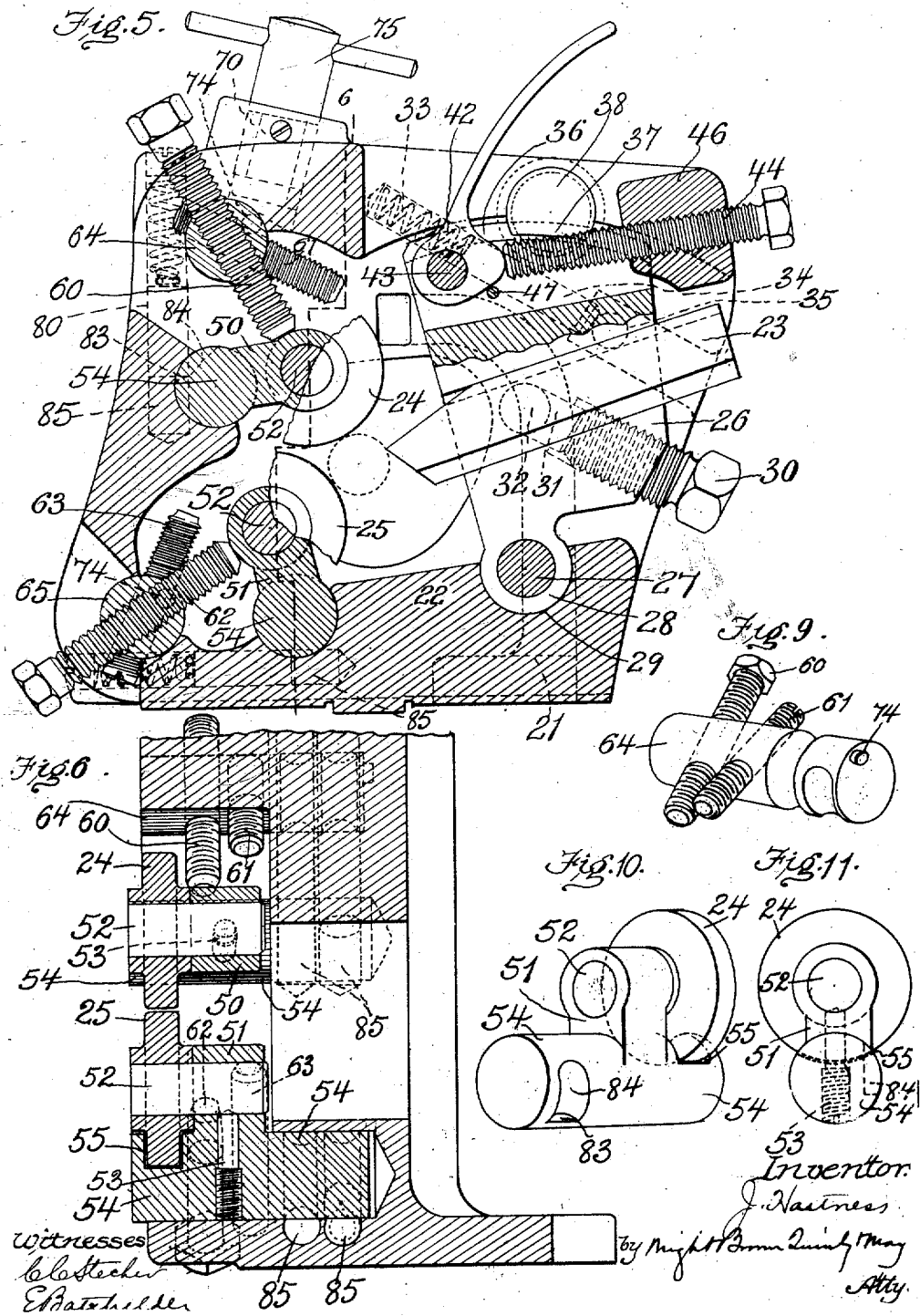

No. 860,802. PATENTED JULY 23, 1907.
J. HARTNESS.
TURNING TOOL.
APPLICATION FILED NOV. 24, 1905.
4 SHEETS—SHEET 4.
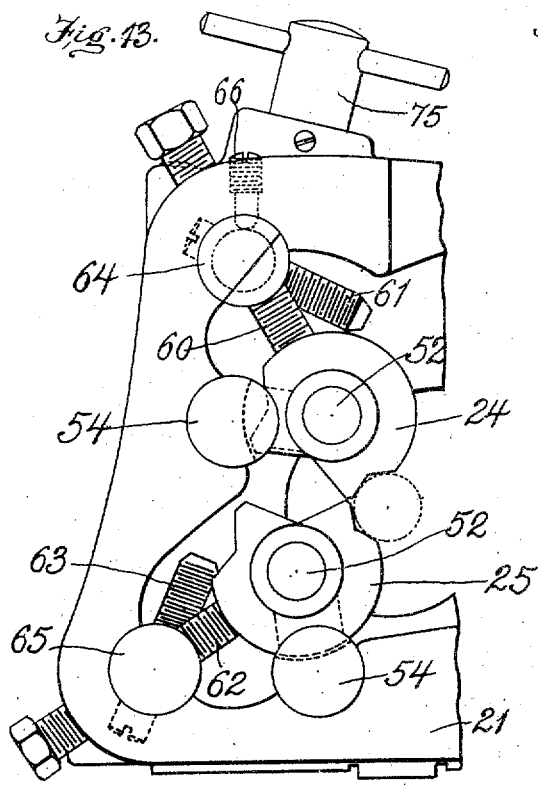
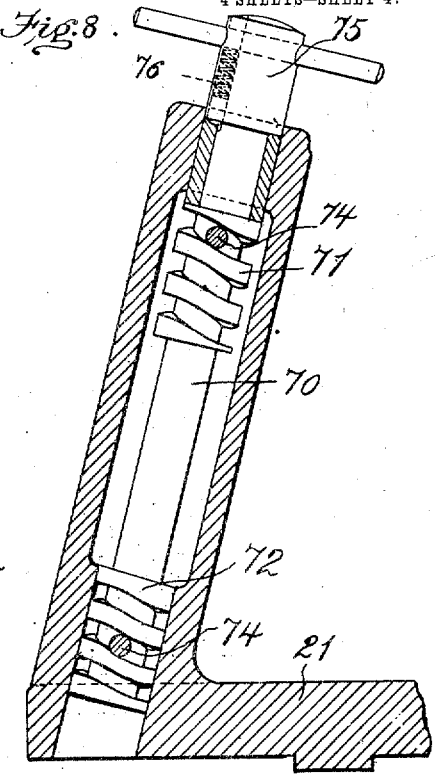
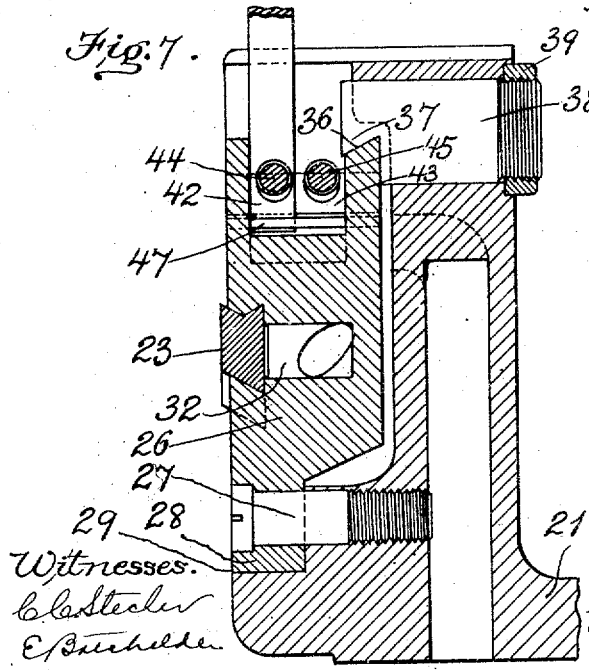
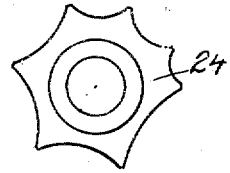
Witnesses.
C. E. Stecker
E. Batchelder
Inventor.
J. Hartness
By Wright Brown Quinby May
Attys

UNITED STATES PATENT OFFICE.

JAMES HARTNESS, OF SPRINGFIELD, VERMONT.

TURNING-TOOL.

No. 860,802.     Specification of Letters Patent.     Patented July 23, 1907.

Application filed November 24, 1905. Serial No. 288,970.

*To all whom it may concern:*

Be it known that I, JAMES HARTNESS, of Springfield, in the county of Windsor and State of Vermont, have invented certain new and useful Improvements in Turning-Tools, of which the following is a specification.

This invention has relation to turning-tools for lathes, of the general character of that set forth in Letters Patent #769,219 granted to me September 6, 1904.

The object of the present invention is to provide certain improvements in turning-tools of the character referred to, in consequence of which the work may be more accurately and firmly supported by the work rests than heretofore, by which the cutter may be easily adjusted with relation to the work and securely held against loose movement and the pressure of the work rests upon the work be distributed over greater areas.

The invention has further to provide improvements for making the tool as a whole more rigid, and more effective than heretofore.

Referring to the accompanying drawings which illustrate one embodiment of the invention, Figure 1 represents my improved turning-tool in plan view and also represents a portion of a turret lathe: Fig. 2 represents a front elevation of the tool: Fig. 3 represents a side elevation: Fig. 4 represents a rear elevation: Fig. 5 represents a vertical section from front to rear of the tool: Fig. 6 represents a section on line 6—6 of Fig. 5. Fig. 7 represents a section on the line 7—7 of Fig. 3: Fig. 8 represents a section on the line 8—8 of Fig. 4: Fig. 9 represents in perspective one of the holders and the abutments carried thereby: Figs. 10 and 11 illustrate one of the work rests and the carrier therefor: Fig. 12 represents a section on the line 12—12 of Fig. 4: Fig. 13 represents the work rests as being formed with reëntrant angles: Fig. 14 represents still another form of work rest.

As I design my tools more especially for employment on a "flat turret" lathe, I have illustrated the tool as provided with a base adapted to fit upon the top of a flat turret. The base of the tool is indicated at 21 and from it rises a standard or frame 22 through which there is an opening for the passage of the work.

The tool is preferably provided with a cutter 23 and with work rests 24—25. Each of these three elements is mounted upon an independent carrier mounted to swing upon an axis substantially parallel with the axis of the work. The carrier 26 is formed with a semi-cylindrical bearing 28 which encircles the screw 27 and finds its seat in the complemental socket 29 formed in the standard or body 21. It is held in place by the bolt 27 passed into the standard or body 22, a short distance above the base 21 and by a gib hereinafter described. The cutter 23, which may be of the usual bar type, is dovetailed into a groove in the face of the carrier, and after being adjusted to position is secured in place by any suitable clamping mechanism, such as a screw 30, the end of which is adapted to force a wedge pin 31 against a similar angularly arranged wedge pin 32 to move it against the cutter. These pins have beveled engaging ends as shown in Figs. 2 and 7. The cutter carrier is adapted to be normally held away from the work by a spring 33 and pin 34 which are arranged in a suitable socket formed in the frame 22, the forward end of the pin 34 engaging a pin 35 projecting laterally from the carrier 26. One feature of the carrier and its mounting to which I desire to call attention is the manner in which the upper end of the carrier is gibbed against the face of the standard. The upper end of the carrier is arcuate, being, in fact, the arc of a circle whose axis is coincident with the axis of movement of the carrier. The upper end of the carrier is grooved from front to rear, the right hand wall of the groove being upwardly and outwardly beveled to provide a guiding surface 36. With this guiding surface coöperates a gib 37 which is formed upon a bar 38 passed through the standard and held in place by a ring nut 39. The inner or right hand face of the carrier is adapted to rest, and is held by the gib, against a bearing surface 40 which is formed on the standard as illustrated in Fig. 3. This gib further holds the carrier firmly in its seat or bearing.

To provide a multiple adjustment of the cutter carrier I employ a plurality of abutments and a single locking member adapted to be engaged with each of them independently of the others. The locking member consists of a cam 42 adapted to be moved axially upon a pivot pin 43 passed transversely through the walls of the groove in the upper end of the carrier. This cam is adapted to play back and forth transversely in the groove so that it may be brought into position to engage either of the two abutments 44—45. These abutments consist of screws which are passed into a projection 46 which extends to the left at the top of the standard so as to bring their ends into position to be engaged by the cam 42. By swinging the cam towards the operator, when it is in position to engage one of the abutments, the cutter carrier will be moved towards the work and locked into position, there being a stop 47 which limits the movement of the cam so that it is held against movement when its major axis registers with the longitudinal median line of the abutment 44—45, as the case may be.

From the foregoing it will be seen that the carrier is firmly seated in a bearing socket in the main casting, well forward and in line with the thrust of the cutter. It is held firmly in its seat by the thrust of the cutter, and by the gib which engages the curved free end of the carrier. The point of the cutter and abutment 44 are in substantially the same plane transversely of the work, so that the abutment directly resists the outward thrust of the cutter in practically a straight line, to eliminate all tendency of the carrier to cant or twist under strain. Each of the work rests consists of either a roller or a swivel, and each is mounted upon a carrier which is adapted to move about an axis parallel with the axis of the roller or swivel. As the two carriers which are indicated at 50 and 51 are alike I shall describe only one of them in detail. This carrier as shown consists of a relatively short arm having a transverse cylindrical aperture, the walls of which are hardened to receive a hardened cylindrical crank pin 52, on which is journaled the work rest 24 or 25. The pin is secured in place by a screw pin 53. The arm at its other end is provided with oppositely projecting trunnions 54, which constitute a rock or crank shaft, and which are fitted in sockets or bearings in the frame or standard. One of the trunnions extends out as far as the end of the hardened crank pin 52 and it is formed with a groove 55 to receive the work rest 24 or 25, as the case may be.

From this construction it will be observed that the work rest has a bearing upon a straight cylindrical pin which is co-extensive with the width of the work rest.

The parts as thus constructed and arranged provide for the production of accurate work, since there is little chance for them to buckle or bend.

The crank shaft is seated solidly upon the casting of which the standard is made, taking bearing thereon from end to end, the outer end serving the important purpose of maintaining the parallelism of the crank shaft to the work, and squarely resisting the thrust of the work, and the work rests have the greatest possible bearing upon their supporting pins relatively to the work.

I provide a plurality of abutments for each of the work rests and likewise provide means for moving corresponding abutments for the two rests simultaneously into and out of active position. These abutments consist of longitudinally adjustable screws of which any suitable number may be employed, those for the top work rest are indicated at 60 and 61 while those for the back rest 25 are indicated at 62—63. The screws 60—61 are passed at an angle to each other through a rotary holder or support 64, while those at 62 and 63 are passed through a similar holder or support 65. Each of these rotary holders or supports is journaled at its ends in suitable bearings afforded by the standard, and each is adapted to be rocked or rotated to bring the end of either of the abutments carried by it into cooperative position with its corresponding work rest. Each of these holders, while adapted to rotate, is held against axial movement by a screw pin 66, the end of which enters a circumferential groove therein. Each of these holders 64—65 is mounted in such position with relation to its corresponding work rest that the abutment carried thereby, which is temporarily active, registers with a line connecting the axis of the work rest with the axis of the work, and is therefore able, being backed by a solid portion of the frame, to squarely resist to the greatest extent the strains occasioned by the engagement of the work with the rest. If desired, each of these abutment holders could be adjusted independently of the other, but as a matter of convenience I provide worms for simultaneously adjusting said holders.

Referring to Figs. 3, 4 and 8 it will be seen that mounted in suitable bearings in the standard there is an inclined shaft 70 having thereon two worms 71—72. These worms are adapted to engage one or more teeth on the holders 64—65. For all general purposes I find that a single tooth for engaging each worm is sufficient, and consequently on the inner end of each holder I place a single tooth or pin 74, this pin being, of course, eccentric to the axis of the holder. By rotating this shaft in one direction or the other the holders will be rocked in opposite directions either towards or from each other, so that the corresponding abutments will be brought simultaneously into active relation with the work rests. The shaft 70 may be equipped with a suitable handle 75 having a spring pressed locking pin 76 for holding it yieldingly in either of the two extreme positions to which it may be rotated. Each of the abutments is carried by the holder and is adapted to engage the extremity of the carrier arm.

To insure that the work rests are held against their abutments as well as to prevent their moving longitudinally, a spring pressed pin 80 is engaged with a shoulder 83 formed by a recess 84 in the trunnion of each of the rest carriers so as to rock the rest towards its abutment. The spring which controls or actuates each pin 80 is indicated at 81 and each pin and its corresponding spring are mounted in a suitable socket 85 formed in the standard, each socket being closed by a short screw 82.

In order that the work rests may either follow the cutter as shown, or else precede it, the rocking carriers are movable in the direction of the axis of the work. That is to say, the crank shaft or trunnions may be slid in their sockets longitudinally for the purpose of bringing the contact of the work rests either with that part of the work that has been finished by the cutter, or else with that portion of the work that has not been reached by the cutter.

There are two of the sockets 85 side by side, so that when the carrier is to be adjusted, the pin 80, spring 81 and screw 82 are removed from one socket, and inserted in the other socket, so as to hold the carrier in the new position to which it has been moved or adjusted.

One of the advantageous features of the above described means for mounting the work rests, is that, as stated, the abutment for each rest, which regulates the diameter-control of the work, is directly in line with the thrust to squarely meet it, without depending on the fit of the rock or crank shaft in its seat except for the purpose of meeting the twisting tendency due to the necessary placing of the abutments to one side of the periphery of the rolls.

In fully explaining the embodiment of the invention which I have illustrated I have described more or less minutely some incidental features which are not strictly essential to the invention, and I therefore do not limit myself to such details.

I desire to have it further understood that the phraseology which I have employed is for the purpose of description and not of limitation, and that the invention may be embodied in other forms which may readily suggest themselves to those skilful in the art to which this invention relates.

I have referred to the fact that in lieu of rollers for use as work rests I may employ swivels, that is to say, instead of having a circular rest which rotates completely about its bearing I may use a roller which has its periphery notched. These notches may be V-shaped or in the form of reëntrant angles, or the notches may be of such shape as to accurately fit work of a particular diameter. In Fig. 13, for instance, each of the swivels or rollers is provided with a plurality of notches or reëntrant angles adapted to fit work of different diameters, whereas in Fig. 14 the notches are rounded. The advantage of a swivel for use as a back rest will probably be apparent at once. I may state, however, that with the introduction of high speed steels it has been found that a back rest which takes a sliding contact with the work limits the speed. Formerly the back rests outlasted the cutting tools, but under present conditions the cutting tool outlasts the back rest. Although rolls have been used to reduce the friction as I propose to use them here under certain conditions, nevertheless there is tendency which cannot be disregarded for the work to carry chips and grit between it and the roll so as to leave defects in the work. Again, if the roll is eccentric or imperfect in shape, the finished work will be affected by this variation. By the use of a swivel back rest I obtain a sliding contact with the work, but since each back rest takes bearing at two points instead of one, it practically reduces by one-half the pressure for a given area of the work, and this greatly increases the endurance of the back rest. I will preferably provide the turner as a whole with interchangeable roller back rests and swivel back rests so that the user may employ either as he sees fit.

Having thus explained the nature of the invention, and described a way of constructing and using the same, although without attempting to set forth all of the forms in which it may be made, or all of the modes of its use, I declare that what I claim is:—

1. In a turning tool, a frame having a bearing socket; a crank shaft journaled in said bearing socket, a crank arm, and a pin on said arm, all constituting a carrier; and a rotatable work rest journaled on said pin and lying substantially between the ends of said crank shaft.

2. In a turning tool, a frame, a rotatable work rest, a rocking carrier for said work rest, said carrier comprising an arm, a crank pin on one end of said arm to serve as a bearing for said work rest, trunnions projecting in opposite directions from the other end of said arm, and a bearing socket in the frame for said trunnion.

3. In a turning tool, a frame having a bearing socket, a rotatable back rest, and a rocking carrier comprising a crank arm, oppositely-extending trunnions at one end of said arm journaled in said socket, a straight headless cylindrical crank pin at the free end of said arm affording a bearing for said back rest throughout the full width thereof, and means independent of the pin for holding said back rest on said pin.

4. In a turning tool, a frame, a rotatable work rest, a straight cylindrical crank pin on which said work rest is journaled, a crank arm having at one end an aperture to receive said pin, trunnions on the opposite end of the crank arm extending in opposite directions to form a crank shaft and fitting in a socket in said frame, one of said trunnions having means for holding the work rest on said pin.

5. In a turning tool, work rests, independent rocking carriers therefor, movable towards and from the work axis, independent adjustable abutments for resisting the thrust of each rest, and means for simultaneously throwing said abutments successively into and out of operative position with respect to their corresponding rests.

6. In a turning tool, independent rocking carriers, work rests on the free ends of said carriers, a plurality of abutments for resisting the thrust of each work rest, a holder for each set of abutments, and means for actuating said holders.

7. In a turning tool, a work rest, a carrier therefor, a rotatable holder, and a plurality of abutments carried by the holder arranged at an angle to each other, whereby said holder may be rotated to bring each abutment into active position with respect to the carrier.

8. In a turning tool, a rocking carrier, a work rest thereon, a rotatable holder and separately adjustable abutments on said holder so arranged with respect to each other that by moving the holder each of said abutments may be brought separately into active position to resist the thrust of the work rest and carrier, and the others moved into inactive positions.

9. In a turning tool, a movable carrier, a work rest thereon, a rotatable holder, an abutment carried thereby and adapted to be moved by said holder to engage the carrier, and means for rotating the holder.

10. In a turning tool, rocking carriers arranged at an angle to each other, a work rest on the free end of each carrier, a movable holder in operative relation to each carrier, a plurality of abutments on each holder adapted to be moved successively into position to resist the thrust of the corresponding carrier, and a device for moving both of said holders.

11. In a turning tool, a work rest, a carrier therefor, a plurality of abutments adapted to separately resist the thrust of the carrier, and means to simultaneously move one of said abutments into and the other out of active position with respect to said carrier.

12. In a turning tool, a work rest, a carrier therefor, a plurality of abutments adapted to separately resist the thrust of the carrier, and a movable holder for said abutments, adapted to move said abutments into active position with respect to the carrier.

13. In a turning tool, a frame, a rocking carrier, a work rest on the free end of said carrier, an abutment screw arranged at an angle to the carrier and having its end engaging the free end of the carrier, said screw being likewise arranged in the line of the thrust of the work against the carrier.

14. In a turning tool, a frame, a rocking carrier, a work rest on the free end of said carrier, a holder socketed in a solid portion of the frame and having an abutment engaging the free end of the carrier, said abutment being arranged in the direct line of thrust of the work against the carrier.

15. In a turning tool, a frame having a socket, a cutter, a cutter carrier having a semi-cylindrical end fitting in said socket in said frame, and a gib on the frame engaging the free end of the carrier and holding said carrier in its socket.

16. In a turning tool, a frame having a semi-cylindrical socket and a bearing face, a cutter, a cutter carrier resting against said face and having a semi-cylindrical end journaled in said socket, and a gib on said frame engaging the free end of said carrier to hold it in its socket and against the said face.

17. A turning tool comprising a frame, a rocking carrier having a recess in its outer face, and having a free end, means for journaling the other end of the carrier in the frame, a cutter in said recess, a locking member arranged and pivoted on the free end of the carrier, substantially in
5 the same plane as the cutter, and an abutment on the frame with which said locking member may be engaged to resist the outward thrust of the cutter.

18. A turning tool comprising a frame, a rocking carrier having a recess and having a free end, a cutter in said
10 recess and means for journaling the other end of the carrier, in combination with the following elements, to wit: an abutment and a coacting pivoted locking member, said elements being connected to the carrier and the frame and being disposed in substantially the vertical plane of the cutter so as to squarely resist the outward thrust of the 15 cutter.

In testimony whereof I have affixed my signature, in presence of two witnesses.

JAMES HARTNESS.

Witnesses:
M. B. May.
C. C. STETCHER.